US006931451B1

(12) United States Patent
Logan et al.

(10) Patent No.: US 6,931,451 B1
(45) Date of Patent: Aug. 16, 2005

(54) SYSTEMS AND METHODS FOR MODIFYING BROADCAST PROGRAMMING

(75) Inventors: James D. Logan, Windham, NH (US); Daniel F. Goessling, Wayland, MA (US); Richard S. Goldhor, Belmont, MA (US)

(73) Assignee: Gotuit Media Corp., Andover, MA (US)

( * ) Notice: Subject to any disclaimer, the term of this patent is extended or adjusted under 35 U.S.C. 154(b) by 0 days.

(21) Appl. No.: 09/536,969

(22) Filed: Mar. 28, 2000

Related U.S. Application Data (63) Continuation-in-part of application No. 08/780,669, filed on Jan. 27, 1999, which is a continuation of application No. 09/238,948, filed on Jan. 7, 1997, now Pat. No. 6,088,455, which is a continuation-in-part of application No. 08/723,641, filed on Oct. 3, 1996, now Pat. No. 5,892,536.

(60) Provisional application No. 60/126,758, filed on Mar. 29, 1999.

(51) Int. Cl.⁷ ............................................. G06F 15/16
(52) U.S. Cl. ..................................... 709/231; 709/201
(58) Field of Search .......................... 704/270; 725/36; 709/203, 217, 219, 247, 231, 201; 435/185; 348/3; 380/217, 200; 455/166.2; 707/501; 379/101.01; 386/83

(56) References Cited

U.S. PATENT DOCUMENTS

| | | | | |
|---|---|---|---|---|
| 5,572,442 A | * | 11/1996 | Schulhof et al. ............. 709/219 |
| 5,659,877 A | * | 8/1997 | Enomoto et al. .............. 725/36 |
| 5,661,787 A | * | 8/1997 | Pocock ................... 379/101.01 |
| 5,721,827 A | * | 2/1998 | Logan et al. ................ 709/217 |
| 5,732,216 A | * | 3/1998 | Logan et al. ................ 709/203 |
| 5,810,600 A | * | 9/1998 | Okada ......................... 434/185 |
| 5,956,629 A | * | 9/1999 | Morrison .................. 455/166.2 |
| 6,025,868 A | * | 2/2000 | Russo ............................ 348/3 |
| 6,026,446 A | * | 2/2000 | Ostrover et al. ............ 709/247 |
| 6,088,455 A | * | 7/2000 | Logan et al. ................ 380/200 |
| 6,122,378 A | * | 9/2000 | Yoshiura et al. ............ 380/217 |
| 6,199,076 B1 | * | 3/2001 | Logan et al. ................ 707/501 |
| 6,505,160 B1 | * | 1/2003 | Levy et al. .................. 704/270 |
| 6,553,178 B2 | * | 4/2003 | Abecassis ..................... 386/83 |

* cited by examiner

Primary Examiner—John Follansbee
Assistant Examiner—Jungwon Chang
(74) Attorney, Agent, or Firm—Charles G. Call (57) ABSTRACT

A system for selecting, erasing or reproducing program recordings using marking and descriptive data which is transmitted to a client location from a remote processing location. A database of identification signals specifying the characteristics of a known programming is maintained at a remote processing location. In a first embodiment, selected identification signals are downloaded from the database to the client location and are used by a processor at the client location to identify desired programming within a locally stored collection of previously received broadcast programming signals. In a second arrangement, locally stored programming signals are processed to extract identification data which is uploaded from the client location to the remote processing location for comparison to the database, and information describing the content of the matching programs is returned to the client location for use as a program guide, facilitating the selection, permanent storage, or playback of desired program records and/or the erasure of undesired programming. To conserve local storage space, identified program records may be uploaded and stored at the remote processing location, or shared program records in a central library may be made available for remote playback after an the identity of equivalent locally stored programming is confirmed.

20 Claims, 6 Drawing Sheets

SYSTEMS AND METHODS FOR MODIFYING BROADCAST PROGRAMMING

CROSS-REFERENCE TO RELATED APPLICATIONS

This application is a continuation in part of and claims the benefit of the filing date of U.S. application Ser. No. 08/780,669 filed on Jan. 7, 1997, now U.S. Pat. No. 6,088,455 and further claims the benefit of the filing dates of U.S. Provisional Patent Application Ser. No. 60/126,758 filed on Mar. 29, 1999 and a continuation in part of and claims the benefit of the filing date of U.S. application No. 09/238,948 filed on Jan. 27, 1999, which was a continuation-in-part of U.S. application Ser. No. 08/723,641 filed on Oct. 3, 1996, now U.S. Pat. No. 5,892,536, the disclosure of which is incorporated herein by reference.

FIELD OF THE INVENTION

The invention relates to systems and methods for processing programming signals, and more particularly, to systems and methods that allow for selecting, identifying, modifying and reproducing recorded programming signals.

BACKGROUND OF THE INVENTION

Today, radio broadcast programming provides an important marketing tool for exposing the general public to commercially available musical recordings. To this end, each regional market typically contains a number of different radio stations, each of which provides programming for a select demographic segment of market. For example, each major regional market typically includes at least one radio station that broadcasts musical selections from Billboard Magazine's Top 40 Hits. Similarly, each regional market typically includes a classical music station that broadcasts musical selections from commercially available recordings of classical music.

Recording studios encourage and promote the broadcasting of musical selections from their studios by providing the radio stations with incentives, including free copies of recent recordings, sponsorships of contests, and local concerts, and other similar marketing techniques. Recording studios deem these promotions to be worthwhile in that marketing studies evidence that consumers purchase musical selections that are familiar to them. Accordingly, recording studios deem that the free distribution of their musical selections through radio broadcast programming facilitates the sales of their products by making the general population familiar with these products.

Although radio broadcasting offers an excellent technique for broadcasting high-quality musical selections, these radio stations are generally mass marketing tools and, therefore, provide programming tailored to universal tastes. However, the universal tastes of the general population generally dictate that radio broadcast programming is to include a varied selection of musical artists. Accordingly, recording studios rarely can convince radio stations to feature one of their artists by providing a sequence of selections from that particular artist. Moreover, radio stations typically emphasize only one or two selections from any one CD, and, therefore, offer a recording studio no outlet for exposing the public to less popular work of a particular artist.

Furthermore, recording studios that produce musical selections which stray from conventional tastes often find that regional markets lack any radio stations suited for carrying their musical selections and, therefore, lack a ready method for exposing the general public to their products.

Additionally, even if a radio station does offer a program suited to less universal tastes, typically that radio program is slotted for a less popular time slot than more universally accepted recordings. Consequently, even though the recording studio is provided with some exposure for its less popular works, the exposure is offered at a time slot that is less popular and, therefore, monitored by a smaller audience.

In response to this failure of existing radio stations to provide a distribution outlet for such recording studios, systems have been developed for distributing musical selections via computer networks, such as the Internet. Although these systems allow each recording studio to deliver inexpensively select copies of their products, the actual distribution is a cumbersome and slow process that requires each user to log onto a particular network site and maintain a connection during the download of the data. This can take as much as forty-five minutes for a high-fidelity audio download. Consequently, the general public disfavors these systems and they are infrequently used.

Accordingly, it is an object of the present invention to provide systems and methods that allow editing of a radio broadcast signal to generate a proprietary radio program.

It is a further object of the present invention to provide alternative methods for distributing audio information.

It is yet another object of the present invention to provide systems and methods for time shifting portions of a radio broadcast programming signal.

Other objects of the invention will be apparent to one of ordinary skill in the art, and others will be made apparent upon review of the following description and from review of the illustrated embodiments in conjunction therewith.

SUMMARY OF THE INVENTION

The invention will be understood in one aspect as systems for editing a radio broadcast programming signal so as to make it more suited to an individual audience member's tastes. In one embodiment, the systems according to the invention include a receiver for receiving a radio broadcast programming signal and which is capable of generating an output signal that can be sent to a data processing system. A data processing system can connect to a communications system that allows a user to download identification information that can be employed by the data processing system to identify certain portions of the radio broadcast programming signal. The data processing system can edit the radio broadcasting programming signal to generate a proprietary programming signal that includes only those musical selections preferred by the respective user.

More particularly, in one embodiment, the invention is understood as apparatus for monitoring a broadcast programming signal. The apparatus can include a receiver having an output for providing a data signal representative of the broadcast programming signal, a data processor, in electrical communication with the output of the receiver, and having a program for directing the data processor to process the data signal to identify a segment of the data signal being representative of a first category of data. The first category of data can be data representative of music, alternatively, of speech or of some other type of information that can be processed with the invention without departing from the scope thereof. Systems of the invention can further include a compression buffer that has an interface coupled to the data processor for transmitting and receiving the data signal, a compression processor for compressing and decompressing the data signal, and a memory for storing the data signal in a compressed format. The system can also have a monitor that couples to the compression buffer for generating as a function of the data signal, an audio signal. These systems can optionally include a delimiter for editing the data signal to include a mark signal which is representative of a starting point of the segment.

In a further embodiment, the apparatus can include a local database memory that has storage for an identification signal being representative of an identifying characteristic of a known segment of the broadcast signal. The segments of a broadcast signal can be understood as a set of discrete portions that make up the signal, such as the songs played during a radio show, the opening theme song of a show, a commercial, or any other of the component programming materials that make up a radio broadcast. These identification signals can be maintained in a local database memory, a remote database accessed by a communication system for connecting to the remote database, or a combination of both.

Additionally, these systems can include a comparator for comparing portions of the segment signal with the identification signals to identify within the segment a known portion of the broadcast programming signal. In this embodiment, the apparatus can include a memory that has storage for an introduction signal associated with the identification signal and being representative of an initial portion of a known segment of the broadcast programming signal. The comparator can compare the introduction signal to the segment to generate a deviation signal which represents the differences between the broadcast programming signal and the introduction signal. In this way, the apparatus of the invention can determine if the initial portion of the segment of the broadcast signal varies from the initial portion of the original version of a known segment. This allows the apparatus to determine if the initial portion of the segment has been "talked over" by an announcer. Optionally, in response to a deviation signal that indicates that the initial portion of a selection has been "talked over", the system can choose to modulate the amplitude of the respective data signal to provide a fade-in effect that allows the detected musical selection to start from a reduced volume and grow louder during the "talked-over" portion to a volume selected by the user.

Accordingly, in one embodiment the invention can include systems that access a remote database, such as a web site or an FTP site, and collect a set of identification signals. The system can then employ the identification signals to hunt through a broadcast program and identify any of these known segments. In an optional embodiment, the apparatus can include an agent for selecting one of the identification signals responsive to a preference characteristic. As such, a user can provide the agent with a set of preferences and the agent can select identification signals dictated by these preferences. This provides a system that edits broadcast signals to correspond to the preferences of an individual audience member.

In a further embodiment of the invention, the system can include a signal processor for analyzing the data signal to identify a characteristic representative of information of a first category. In this embodiment, the signal processor can include a scene change detector for identifying a discontinuity in the signal content of the data signal. The signal processor can include a voice recognition processor for detecting an occurrence of a speech signal within the data signal. The signal processor can allow the detection of transition points between different segments of the broadcast signal.

The systems of the invention can also include a transition detector for identifying a transition marker within the data signal. A data processor can include a digital encoder that has a sample rate controller for generating at a selected sample rate a signal representative of the broadcast programming signal. Moreover, the apparatus can include a playback control for controlling the rate of providing the data signal to the compression processor. In this embodiment, the compression processor can include a feedback generator for generating a feedback signal representative of an audio indication of a rate of providing the data signal to the compression processor.

Optionally, the systems of the invention can include a search element for searching the data signals as a function of the mark signal to move between segments of the data signal. These systems can also include a monitor that has a fade control, responsive to a deviation signal, for controlling a volume of an audio signal. Further the systems can have a timer controller for generating the audio signal at a select time.

Systems according to the invention can be used for storing and playing captured segment signals. The systems can include a playback controller for providing the storage segment signals to the monitor in a select order. The segment memory can include an attribute memory for storing an attribute signal representative of a characteristic of a respective one of the segments. The playback controller can include an element for providing segments to the monitor as a function of the attribute signal, and the attribute signal can be generated by an attribute generator which can generate the attribute signal to be representative of a characteristic of the segment including its length, date of recording, associated performing artist, or any other characteristic.

The systems of the invention can also include a segment memory that has an encryption element for storing the segment in an encrypted format, and can further include a shredding mechanism for shredding the segment in response to providing the respective segment to the monitor.

Moreover, the invention can include a clipping element that is responsive to the mark signals for generating a copy of the segment. A notation element can provide a notation signal for that particular copy, and the copy and the notation signal can be delivered, such as by e-mail, to another user or location.

As further contemplated by the invention, identification data can be derived at the client location from locally stored recorded program selections, and this identification data may then be uploaded to a remote processing location for comparison with a database of program identification data. When matches are detected, program attribute data, such as the specification of the matching selection's title, performer, album title, date, etc., may be downloaded to the client location to serve as a program guide to facilitate the selection, playback, archiving and erasure of programming in the local store.

To conserve local storage space, recorded programs at the client location may be uploaded for storage at the remote processing location, and thereafter retrieved for playback by the user at remote locations, without the need to retain the original material. In addition, when the user has uploaded identification data to the remote processing location which demonstrates that the user already has a copy of a given program recording, an entry may be made in an accounting file which may thereafter be used to authorize that user to access a shared copy of the given recording stored in a program library, without the need to upload an equivalent copy from the client location. Means may be employed to ensure that only one "virtual" copy of the given program selection may be reproduced at any time, including means for disabling the playback of the local copy when the remote copy is available, and disabling the playback of the remotely stored copy by that user when the locally stored copy is enabled.

BRIEF DESCRIPTION OF THE ILLUSTRATED EMBODIMENTS

DESCRIPTION OF THE ILLUSTRATED EMBODIMENTS

Figure 1:
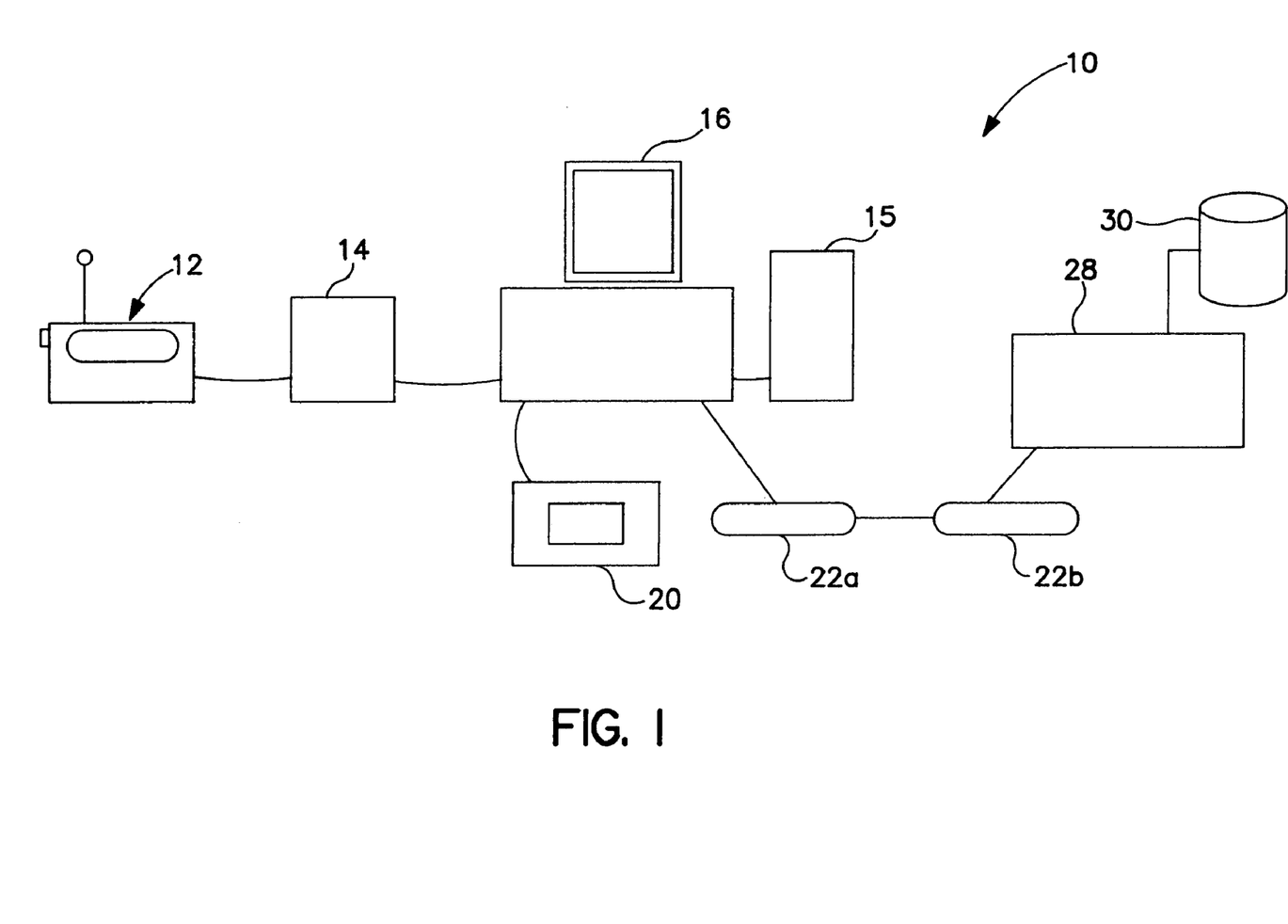
FIG. 1 depicts a functional block diagram of one system for modifying broadcast signals according to the invention.

FIG. 1 depicts a system 10 that includes a receiver 12, a digital processor 14, a data processor 16, a speaker 18, a recording element 20, a communications system 22, a remote data processor 28 and a remote database 30.

As depicted by FIG. 1, the receiver 12 couples via a transmission path to the digital processor 14 which couples via a transmission path to the data processor 16. The data processor 16 couples to the cassette recorder 20, the speaker 18 and the communications system 22. The communication system 22 includes a first element coupled to the processor 16 via a transmission path and a second element 22B and that couples to the communications system 22A via a communications path illustrated in FIG. 1 as a dotted line. The communications system 22B couples to the remote processor 28 to deliver signals therebetween and the remote processor 28 couples via a transmission path to the remote database 30.

In the illustrated embodiment, the receiver 12 is depicted as a FM radio receiver that includes an antenna for receiving broadcast programming signals transmitted as radio frequency (RF) signals. The depicted receiver 12 includes a tuner element for selecting a particular channel for receiving radio programming broadcasts transmitted on that channel. The receiver 12 includes an output and provides a data signal to the digital processor 14. The receiver 12 can provide an output data signal in an analog format that can be received by the digital processor 14 and digitally sampled by the processor 14. The digitally encoded signal can be provided via the illustrated transmission path to the data processing system 16.

The receiver 12, which is depicted as an RF tuner, can be any receiver element suitable for receiving broadcast programming signals and that includes an output for providing a data signal representative of the broadcast programming signal for processing by the systems 10. Any suitable transmission path can be employed for communicating data between the elements of the systems, including optical fiber, radio frequency link, electrical bus, or any other path suitable for transmitting data. Further, multiple tuners can be connected to the system to allow for simultaneous scanning of multiple broadcast channels.

Optionally the receiver 12 can comprise a data communication interface for receiving signals via the Internet and representative of streamed audio information. The communication interface will include a software audio processor, such as Progressive Networks read audio codec software that converts a bit stream into an audio signal. Optionally, song identification can be performed in part by decoding identification data transferred with the streamed audio. The identification can be employed to turn the depicted recording system 20, on and off.

In one embodiment of the system 10, the receiver 12 is a conventional stereo tuner and couples to a digital processor 14 that comprises a sound card, such as the SoundBlaster card manufactured by the Creative Labs Company, which is coupled into the backplane of the data processor 16. Alternatively, the receiver 12 can be a computer peripheral that is mountable within the backplane of the data processor 16 and that includes a receiver element for demodulating RF frequency broadcast transmissions and that includes a digital processor, such as the digital processor 14, for generating digital signals representative of the demodulated transmissions.

The digital processor 14 optionally includes a sample rate controller that allows for the selective control of the digital sample rate employed for digitizing the data signal provided by the receiver 12. Optionally, the sample rate controller operates under the instruction of the data processing system 16 to provide a digitized data signal having a select sample rate. This provides, inter alia, control over the file size of the digitized data signal. By selectively controlling the sample rate of the output signal, the digital processor 14 allows the data processor 16 to reduce file size with an associated loss of fidelity. Conversely, increasing the sample rate of the output signal will produce larger file sizes and provide digital data signals having higher fidelity.

The data processor 16 depicted in FIG. 1 can be a conventional digital data processing system, such as an IBM PC-compatible system. Such systems can include a central processing unit, a programming memory and a data storage memory. In the embodiment depicted in FIG. 1, the data processor 16 includes a computer program that executes on the data processor 16 to configure the data processor 16 as a device according to the invention for modifying a broadcast programming signal to generate a proprietary program signal that can be more suited to the individual users tastes and preferences. In one embodiment, the program directs the data processor to employ a comparator that can identify known segments of the broadcast programming signal. The comparator can be a electrical circuit card assembly, a software program, or a combination of both. As will be explained in greater detail hereinafter, the comparator can employ known signal processing techniques that identify a signal by comparing the signal, to a library of known signals or signal characteristics.

To this end, the data processor 16 can optionally include a compression buffer that has an interface to receive the data signal provided by the digital processor 14. The interface can be hardware or software depending upon the integration of the digital processor 14 with the data processor 16, and allows for the exchange of data. The compression buffer can further include a compression processor that compresses and decompresses the data signal into a signal format that has reduced size and therefore facilitates the storing of large volumes of data. The compression buffer further will include an interface to a memory for storing the data signal in the compressed format. One compression buffer suitable for use in the present invention is described in U.S. Pat. No. 5,371,551 issued to Logan et al., the teachings of which are incorporated herein by reference.

In an alternative embodiment, the data processor 16 can include a compression buffer implemented by a software module operating on the data processor 16 to receive the data signal from the digital processor 14 and to store the data signal in a compressed format within a memory element of the data processor 16. The data processor 16 can include a memory element for storing the compressed data signal, and the memory element can be a persistent memory element such as a hard disk or tape drive, or a volatile memory element such as an electronic memory. The electronic memory can comprise a RAM memory element and can further include a cache RAM memory having storage for a portion of the data signal.

The data processor 16 can connect to a monitor element that couples to the compression buffer and generates, as a function of the data signal, an audio signal. The monitor can be any audio generator suitable for processing the data signal to generate an audio signal of the type suitable for playing over a speaker, such as the depicted speaker element 18. In one embodiment of the invention, the monitor element can be a sound card that couples into the backplane of the data processing system 16 and that couples to a speaker such as the depicted speaker 18. The speaker 18 can be any speaker including any of the commercially available speaker systems marketed for use with multi-media computer applications.

The data processor 16 can optionally include a timer that provides a computer readable time signal representative of the time of day. The program operating on the data processor 16 can employ the timer to provide the data signal to the monitor at a selected time, to therefore play the proprietary programming signal at a user-selected time. The timer can be a computer peripheral clock element including any of the conventional computer clock elements commonly used with data processing systems such as the data processor 16.

The depicted cassette recorder 20 can be a conventional recorder element suitable for connecting to an audio signal generator, such as a conventional sound card computer peripheral. The recorder 20 depicted in FIG. 1 is shown as a cassette recorder element that records an audio signal onto a cassette tape to provide a persistent record copy of the audio signal. The recording process can be directed by the program operating on the data processor, and allows a user to create audio tapes of selected songs. Although the depicted embodiment includes a cassette recorder, it will apparent to one of ordinary skill in the art that this optional element can be any recording element suitable for providing a persistent record copy of the audio signal.

The depicted communication systems 22A and 22B are devices that allow for the transmission of computer readable data signals between a local and remote computer system. In one embodiment both communication systems 22A and 22B are telecommunications systems, such as modems, suitable for transmitting data signals across the public switching telephone network (PSTN).

The communication system 22B couples to a remote data processor 28. The remote data processor 28 can be a digital data processor system of the type suitable for running a Web server process that provides a remote node, such as the data processor 16, with graphical access to computer readable data, such as data that is accessed over the Internet via Universal Resource Locators (URLs). As further depicted in FIG. 1, the remote data processor 28 can couple via a transmission path to the remote database element 30. The remote database element 30 can be a computer memory system that provides persistent memory storage for computer readable information. In one embodiment, the computer memory 30 provides storage for identification signals wherein each identification signal can be representative of an identifying characteristic of a known portion of a broadcast signal. For example, the identification signal can be a set of features that have been extracted from a musical selection, such as a song, and which act as an identifying characteristic of that particular song. Accordingly, the data processor 28 in operation with the memory 30 can provide a web site that a user of the data processor 16 employs to couple to URLs or other data sites that provide identification signals for identifying portions of the broadcast signal captured by the receiver element 12. The identification signals can be directly downloaded, or can be selected for delivery by an alternate method, such as mail delivery of a CD-ROM or disk having the signals stored thereon.

In operation, a user at the data processing system 16 can log on to a Web service running on the digital processor 28 and from the Web service identify hypertext links to URLs of identification signals for songs of interest to that particular user. The user can download the identification signals to a local database and employ the local database to search the broadcast programming signal to identify songs of interest to that user. Alternatively, the data processor 16 can employ agent software modules that search through sources of computer readable information to identify identification signals that are of interest to the user. These agent modules can be of the type developed by the Firefly Corporation of Cambridge, Mass. However, any agents suitable for searching sources of computer readable information and for selecting portions of that computer readable information can be practiced with the invention without departing from the scope thereof.

Figure 2:
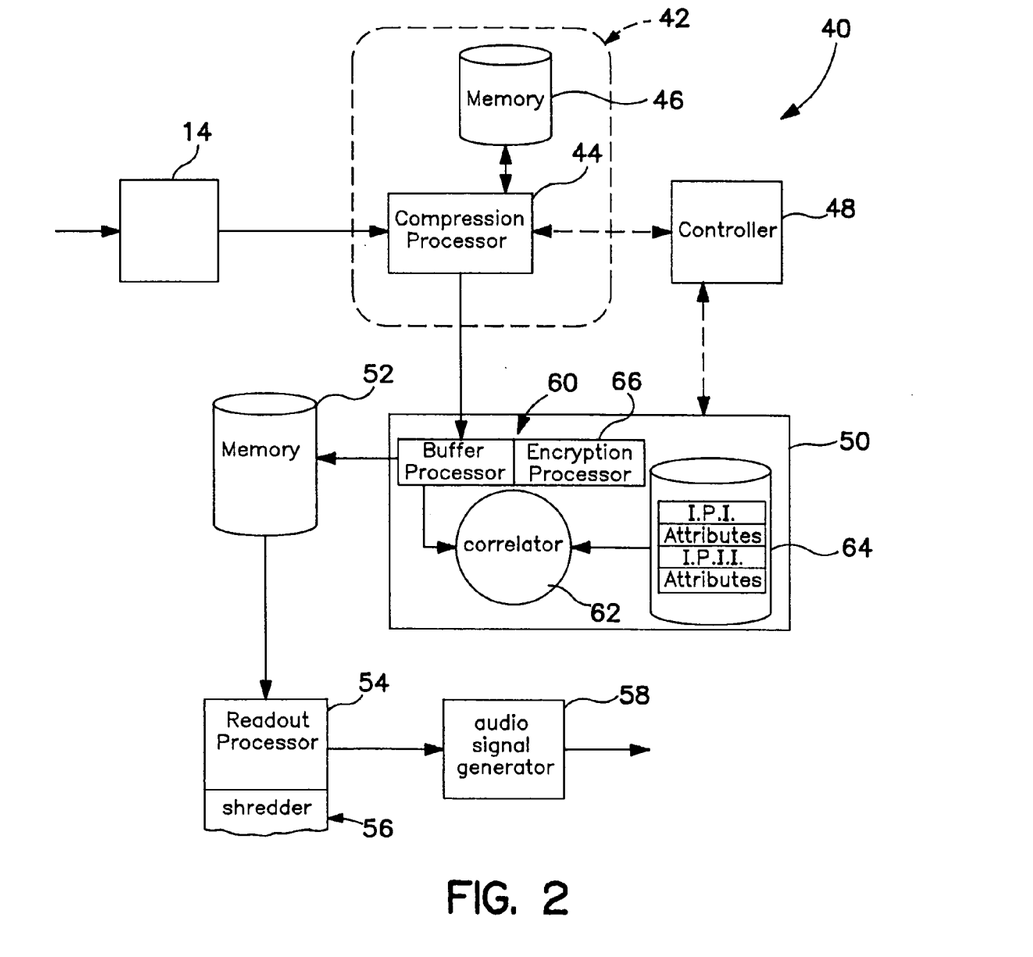
FIG. 2 depicts one embodiment of a system for identifying segments of a broadcast signal suitable for use with the system depicted in FIG. 1.

FIG. 2 depicts in more detail, an embodiment of the invention that employs the identification signals, such as the type which can be downloaded from a remote Web site, to identify segments of the data signal provided by the receiver 12. As depicted in FIG. 2, the system 40 includes a compression buffer 42 having a compression processor 44 and a compression memory 46, a controller 48, a comparator 50, a segment memory 52, a read-out processor 54, an audio signal generator 58, a buffer processor 60, a correlator 62, and an identification signal memory 64.

As for the embodiment depicted in FIG. 2, the digital processor 14 coupled to the compression buffer 42 provides a digitized data signal to the compression processor 44. The compression processor 44 can compress the digitized data signal into a format that requires reduced storage space to store the compressed digital data signal within the compression memory 46. Again, the compression buffer 42 depicted in FIG. 2 can be a compression processor of the type described in U.S. Pat. No. 5,371,551 issued to Logan et al. Alternatively, the compression buffer can be a software module executing on a digital data processing system to store the digital data signal in a compressed format within the persistent or volatile memory of the data processing system.

As further depicted in FIG. 2, the compression buffer 42 couples via a transmission path to the comparator element 50. The compression buffer 42 passes, via the transmission path, a decompressed version of the digital data signal to the buffer processor 60 of the comparator 50. The buffer processor 60 can be an electrical circuit card assembly that includes a data processor and a computer memory. The computer memory can have a data memory for buffer storing the data signal, and a program memory for storing a series of instructions for directing the operation of the buffer processor 60. In operation, the buffer processor 60 can store a portion of the data signal within the computer memory. The correlator element 62 can couple between the buffer processor 60 and the identification signal memory 64. The identification signal memory 64 can store identification signals, each of which is representative of a portion of a known segment of the broadcast programming signal. In one practice, a segment of the broadcast programming signal can be a single song selection. Alternatively, a segment can be an opening theme song to a radio program, an advertisement, or any other portion of a radio broadcast that can represent a discrete segment of that radio program.

The identification signal memory 64 can store for any one of the segments, an identification signal that has information suitable for identifying the occurrence of that known segment within the data signal provided by the receiver element 12. Accordingly, the comparator 50 searches the data signal representative of the broadcast programming signal for the occurrence of one or more of those known segments by identifying an identification signal stored within the identification signal memory 64 and representative of the known segment.

As depicted in FIG. 2, the correlator element 62 connects between the buffer processor 60 and the identification signal memory 64. The controller 48 will direct the compression buffer 42 to download a portion of the data signal stored in a compressed format within the memory 46 to the buffer processor 60. The correlator 62 can then process the portion of the data signal within the buffer. Processor 60 can correlate that downloaded portion with one or more of the identification signals stored within the identification signal memory 64. If the correlator 62 determines no match to exist between that portion of the data signal and any one of the identification signals within the memory 64, the comparator 50, via the depicted bi-directional transmission path, informs the controller 48 and the controller 48 directs the compression buffer 42 to download another segment of the data signal.

The comparator 50 depicted in FIG. 2 can employ any correlation device or technique for processing an identification signal to detect the occurrence of a known segment of a data signal. In one embodiment, the comparator 50 includes a correlator 62 of the type disclosed in U.S. Pat. No. 4,843,562 issued to Kenyon et al., the teachings of which are incorporated herein by reference. The comparator 50 can be an electrical circuit card assembly or a software module executing on the data processor 16. In the embodiment depicted in FIG. 2, the comparator 50 includes an identification signal memory 64 that has identification signals and attribute signals associated with the program segment identified by the respective identification signal.

In one embodiment, the attribute signal is representative of the length of the segment being identified. More particularly, the attribute signal provides a preceding signal length and a succeeding signal length, each of which respectively describes the period of time that the known segment runs respective to the portion of the segment that is associated with the identification signal. Consequently, the correlator 62, upon detecting a match between the data signal in the buffer processor 60 and one of the identification signals, can delimit a beginning and end for the segment associated with the respective identification signal. For example, an identification signal within memory 64 can include an attribute signal that identifies the length of time that the program segment runs before the occurrence of the identifying portion and similarly the length of time that the program segment continues for after the occurrence of the identifying portion. The buffer processor 60 can include a computer program that can employ these attribute signals to generate a mark signal that delimits the beginning and end of the program segment to mark one segment of the broadcast programming signal.

In a further embodiment, these systems can include a memory that has storage for an introduction signal associated with the identification signal that is representative of an initial segment of the known segment of the broadcast programming signal. The comparator can compare the introduction signal to the segment to generate a deviation signal which represents the differences between the broadcast programming signal and the introduction signal. In this way, the apparatus of the invention can determine if the initial portion of the segment of the broadcast signal varies from the initial portion of the original version of a known segment. This allows the apparatus to determine if the initial portion of the segment has been "talked over" by an announcer. Optionally, in response to a deviation signal that indicates the initial portion of a selection has been "talked over", the system can include a fade control to modulate the amplitude of the respective data signal to provide a fade-in effect that allows the detected musical selection to start from a reduced volume and grown louder during the "talked over" portion to a volume selected by the user.

Upon marking a known segment, the buffer processor 60 can store the segment within the segment memory 52 to provide a database of selected segments. In the depicted embodiment, the buffer processor 60 includes an encryption processor 66 that operates as an encryption mechanism that encrypts the segments for storing in an encrypted format. The encryption processor can implement a private key encryption process that employs a key stored in the buffer processor and maintained in secret from the user. The encryption processor 66, therefore, provides segments in an encrypted format for being stored in memory 52. This provides a database of segment signals that cannot be copied by the user to make unauthorized reproductions of stored segment signals. In the depicted embodiment, the encryption processor 66 is illustrated as part of the buffer processor 60. However, the encryption processor 66 can be disposed at other locations, including at the memory 52, the output of the digital processor 14 with a decryption processor positioned before the correlator 62, and at any other suitable location. Any encryption processor that can encrypt the data signals can be employed by the invention.

The segment memory 52 can be any memory device suitable for storing data signals representative of computer readable information, including a disk drive, a tape drive, or any other memory device. The segments can be stored as a data file or in any other suitable format. The memory 52 can couple to the read-out processor 54 that can read out the data from memory 52 and provide the data to the audio signal generator 58 that provides a signal suitable for playing over a speaker, such as the speaker 18 depicted in FIG. 1.

The buffer processor 60 can also include a program that operates as an attribute generator for generating attribute signals in a format suitable for storing with the segments. The generator can provide title attributes, data attributes, album attributes, and other characteristic information. The attribute information can be stored in the memory 52 or in a separate attribute memory. The playback controller can employ the attribute information to retrieve segments in a select order, for example, by artist data, style, album order, or any other such order that can be provided by attribute signals.

The read-out processor 54 can optionally include a playback control for controlling the rate at which the data signal is played as an audio signal. Signal processing techniques for compressing the playing time of an audio signal are commonly employed by broadcast stations, and others, and are techniques well known in the art of signal processing. Any of these techniques can be employed by the read-out processor, the audio signal generator 58, or a separate playback controller element.

The playback control allows a user at the data processing system 16 to control the rate at which segments are played back through the speaker 18. The playback control can also include a pitch control mechanism, including any of the known pitch control systems suitable for controlling the pitch of the audio signal. Further, the playback controller can include a search mechanism that detects marker signals between segments for searching between the stored segments. The marker signals can include title and other information and can be inserted by a computer program executing on the buffer processor 60 as segments are stored in the memory 52. This allows a user at station 16 (the user's data processor) to fast forward through the different segments stored in memory 54.

In conjunction with the playback control, the read-out processor 54 can include a feedback generator that mixes with the segment a feedback signal that provides an audio indication of the rate at which the data signal is being provided to the audio generator 58. The feedback generator can alternatively intermix feedback data with the data signal being provided to the audio generator. This will provide an audio feedback signal that will provide an indication as to the rate at which segments are being played out of the memory 52. In one practice, the feedback generator generates a squeal signal that provides an audio signal reminiscent of the sound provided by a cassette tape when the tape is being fast forwarded through a cassette recorder and gives an audio indication of the rate of fast forward.

Alternatively, the feedback generator can process the data signal to provide a playback signal that sounds like the audio signal being played at a higher than normal speed. This also provides an audio indication of the playback rate, and allows a user to listen for marker signals, and thereby check if the markers have been properly inserted at the beginning and ends of the signal. The program will allow manual editing to correct misplaced markers.

Figure 3:
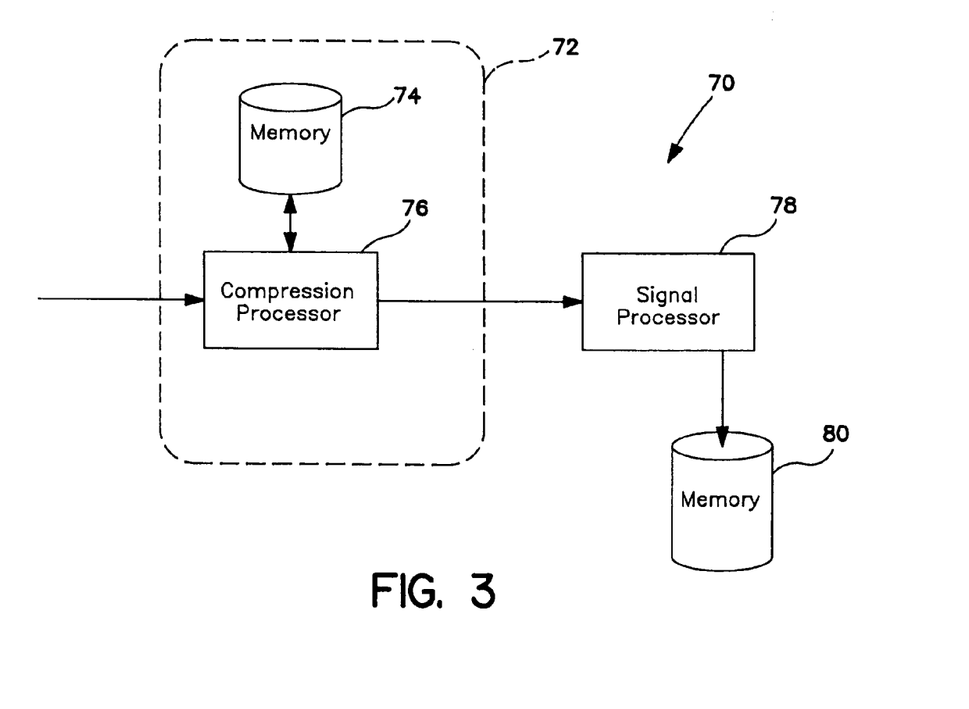
FIG. 3 depicts an alternative embodiment of a system for identifying segments and being practicable with the system depicted in FIG. 1.

The editing program also allows a user to clip a segment and direct that segment to be stored by the recording element 20 depicted in FIG. 3. Additionally, the editing program can receive input from a notation element, like a keyboard, or microphone, to add user generated data to the clipped segment. The annotated segment can be recorded, or clipped and transferred by email, or other data transfer system to a remote site.

The depicted readout processor can be a circuit card assembly or a software module. The depicted readout processor 54 includes a shredder mechanism 56 that can decrypt an encrypted segment signal, to provide to the audio generator 58 a signal suitable for processing into an audio signal. Further, the shredder mechanism can delete any decrypted segment signal after it is transmitted to the audio signal generator 58, and can shred any copies of encrypted or decrypted segment signals by encrypting such signals with a randomly generated key, typically provided by a random number generator in the processor that is deleted after encryption of the segment signals. This allows the shredder 56 to delete any copies of the segment and to prevent the making of additional copies.

FIG. 3 depicts an alternative embodiment of the invention that employs a signal processor to identify segments of a data signal provided by the receiver 12. As depicted in FIG. 2, there is a system 70 that includes a compression buffer 72 having a memory 74, and a compression processor 76. As further shown, the system 70 includes a signal processor 78 that can couple to the compression buffer 72 and that can further couple to a memory 80.

The depicted compression buffer 72 can be, as described above, a compression buffer that receives a data signal from the receiver 12 and that provides storage, in a compressed format, for that data signal. Also as described above, this compression buffer 72 can follow from the teachings of U.S. Pat. No. 5,371,557 issued to Logan et al. The depicted signal processor 78 can be an electronic circuit card assembly that couples into the backplane of the data processor 16 depicted in FIG. 1. The signal processor 78 processes a signal provided by the compression buffer 72 to identify segments of that data signal that are of interest to a system user. In one embodiment, the signal processor 78 employs a scene-change analysis process for determining transition markers that occur within the data signal and that are representative of transitions between segments of the program. One scene change analysis process detects known marks inserted within the broadcast programming signal. For example, scene change processes exist that detect a black screen signal within a TV signal, wherein the black screen signals identify segments like commercials, local programming signals, and other segments. Similarly, a radio broadcast programming signal can include scene changes identified by a marker such as a tone or other encoded signal, even a jingle. The scene change process detects the marker to identify transitions between segments of the broadcast signal. However, any discontinuity can be detected for determining changes between scenes.

Alternatively, signal processor 78 can include a voice recognition process that distinguishes music from speech. The signal processor 78 employs this process to detect transitions between segments of the data signal which are representative of speech signals, and which are typically associated with advertisements, news, and other program segments that a user may wish to filter from the programming signal.

In this embodiment, the signal processor 78 identifies those portions of the data signal that are representative of speech signals and deletes these segments from the data signal. The signal processor 78 then stores the modified data signal within the memory 80. Further, the signal processor 78 could process the signal to detect other attributes of the programming signal, including attributes related to user preferences, such as voice recognition to detect selected speakers or artists, songs with lyrics, songs without lyrics, certain instruments, and other such attributes. In this embodiment, segments having select attributes can be saved from the broadcast and stored. Accordingly, the data processor 16 shown in FIG. 1 can apply the modified data signal stored in memory 80 to the monitor and thereby provide an audio signal that contains a reduced content of advertising, news, voice over, and other interruptions to the broadcast music program.

Figure 4:
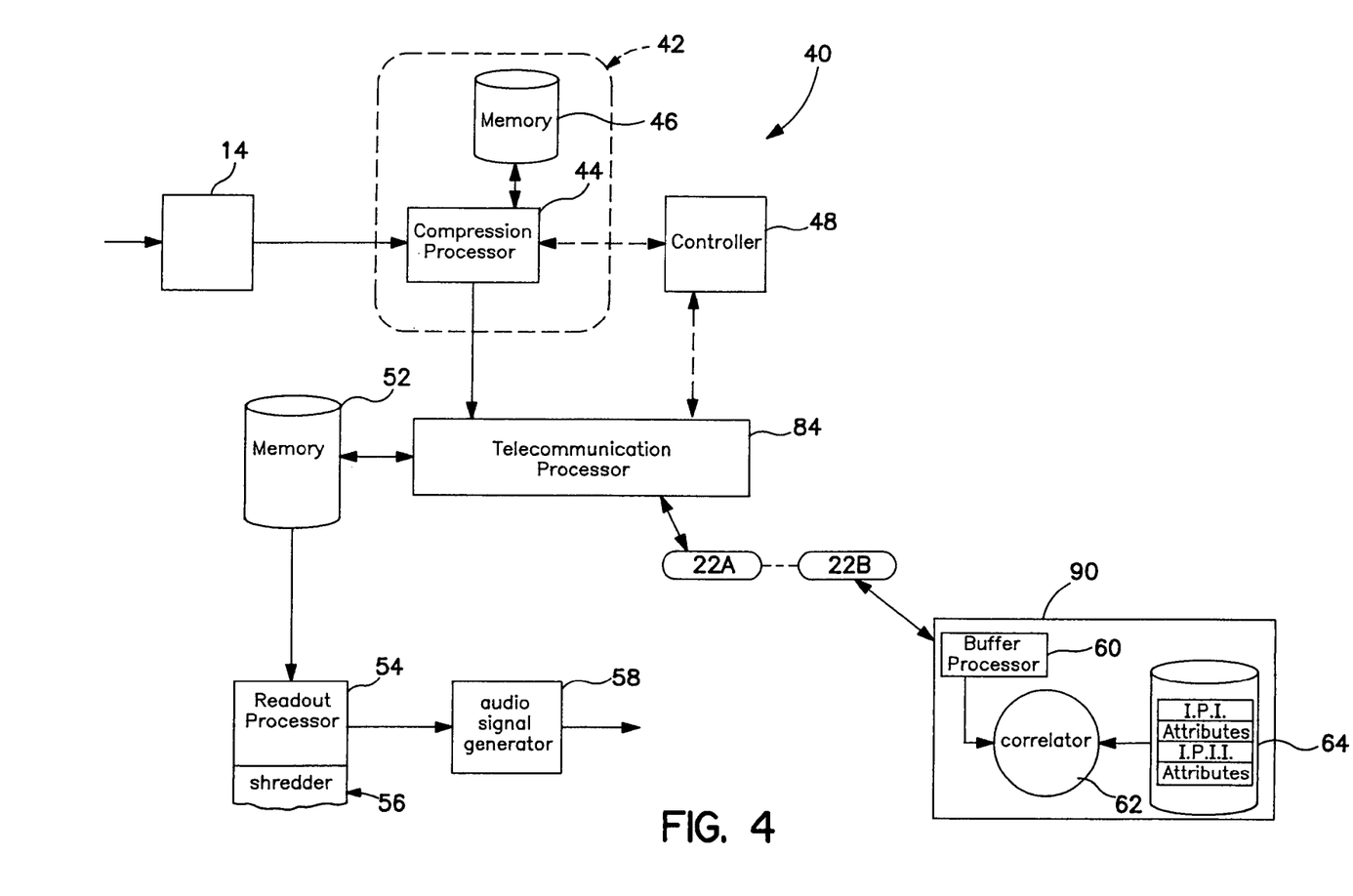
FIG. 4 depicts an embodiment of the invention that includes a remote system for identifying segments of a broadcast signal.

FIG. 4 depicts a further alternative embodiment of the invention and includes a telecommunication processor 84 that couples via the communication processors 22A and 22B to a remote data processor 90, such as a web site, that includes a comparator configured as the comparator 50 shown in FIG. 2. In particular, the comparator includes the buffer processor 60, a correlator 62, and an identification signal memory 64.

In this embodiment, the data processor 16 can extract the information from the broadcast signal and operate the telecommunication processor 84 to send the information via the datalink 22A and 22B to the remote computer system 90. The remote computer system 90 can then process the signals, according to any of these techniques described above, and send back identification information to the local data processor 16. In this way, the signal processing operations employed for identifying known segments of a broadcast programming signal can be run on a remote computer system, and the local database of identification signals depicted in FIG. 2, can be replaced by a shared resource memory.

Accordingly, one advantage of the system depicted in FIG. 4 is that the remote processor can be controlled, updated, and modified by a system administrator. This can allow the system administrator to update readily the recognition algorithms employed by the processor 90 as well as to provide computer hardware more suitable than the conventional data processing systems, to provide rapid recognition of known segments of a broadcast programming signal.

The depicted telecommunications processor 84 can be an electronic circuit card assembly or a software module running on the data processor 16 and interfaces to the compression processor 44, the controller 48, the memory 52, and the communications system 22A. The telecommunications processor 84 bundles portions of the data signal provided by the compression processor 44 for transmission via the communications modules 22A and 22B to the remote processor 90. As described above, the comparator within the processor 90 can determine if the data signal transmitted by the telecommunication processor 84 contains a known segment. If no known segment is identified, the processor 90 through the communication modules 22A and 22B can notify the telecommunication processor 84 which, via a bi-directional bus, directs the controller 48 to operate the compression processor 44 to download another portion of the data signal. This operation continues, as discussed above, until the entire data signal has been processed and those portions of the signal which have been recognized by the processor 90 have had via identification information transmitted from processor 90 via communication modules 22A and 22B to the telecommunication processor 84 for storage within the memory 52.

In a further embodiment of the invention, the systems include a signal-to-noise processor that improves the audio fidelity of segments collected by a particular user. In this embodiment, the signal-to-noise processor records a particular program segment several times and combines the recordings. The effect of this is to increase the signal-to-noise ratio, for example by approximately 3 dB, for two recordings, 6 dB, for four recordings, and so forth. This multiple recording technique takes advantage of one characteristic of noise, namely that it is a stochastic component of a signal. Accordingly, as noise is a zero-mean Gaussian signal and each recording is made with a radio signal of approximately equal strength, or can be so adjusted by the signal processor, the combination of multiple recordings provides for improved signal-to-noise characteristics for the identified segment.

In this embodiment, the signal-to-noise processor can further include a time alignment processor that corrects for the tempo changes applied to a particular program segment, i.e. broadcasting radio station. For example, a broadcasting radio station may, for the purposes of complying with predefined program schedules, speed up or slow down a musical recording to have the program segment fall within the predefined schedule. The tempo processor provides for correlation of the two signals. The correlation of the signals can be performed as described above, or by employment of any of the known techniques for correlating a plurality of signals. By correlation of the plural recorded program segments, the signal-to-noise processor can combine the plural signals to generate a single program segment recording having improved audio fidelity.

In an optional embodiment of the invention, the systems include a playback controller, as described above, that further includes a system for providing identification information for selected segments of the broadcast programming signal. For example, the system could identify attributes for particular segments, such as the title of the segment, the artist performing the segment, one or more albums that have a recording of this segment, and other such information.

In one embodiment, the system can employ the identification signals stored in the identification memory 64. Each identification signal can include a set of attributes which provides information useful to the user to identify the program segment associated with the respective identification signal. Upon identification of a program segment, the system can provide, for example, by displaying on a video screen of data processor 16, the user with attribute information that identifies the program segment.

In an alternative embodiment of the invention, the system can access a remote site having access to a large database of identification signals and associated attributes. At this remote site, a portion of the broadcast sent by the system can be compared to the identification signals that are stored within the database to identify a known segment of the broadcast. Upon identification of one or more program segments, the attribute signals associated with these program segments can be transferred to the user's system to provide the user with information that is descriptive of the identity of the respective program segments.

Accordingly, in these embodiments of the invention, the system provides for a user to identify the name of a song being played on a radio by comparing a portion of a broadcast programming signal being monitored with a series of identification signals stored in a database, remote or local, which provides information about the title, or other attributes, of the song being identified. In alternative practices of the invention, these systems for identifying attributes of a particular program segment can employ other techniques for capturing characteristics of the program segment which can be compared against characteristics of known segments stored in a database.

For example, a profile of a characteristic of a segment can be generated by examining the short-term energy of a particular segment, or portion of a segment. This profile can be compared against a database of known profiles for certain segments to identify one or more segments that have similar profiles. Other information, such as the radio station broadcast channel, time of day, user preferences and so forth, can be employed for narrowing the list of identified segments to identify, more particularly, one or more profiles of segments that are likely to be the segment being monitored by the user. The identified segment or segments can be provided to the user, thereby identifying the segment being monitored.

The present invention allows a listener or viewer to enjoy selected, previously broadcast radio or television programs or program segments at a later when it is more convenient or desirable. In particular, previously broadcast musical programming segments (here referred to as "songs") can be easily identified and replayed.

Figure 5:
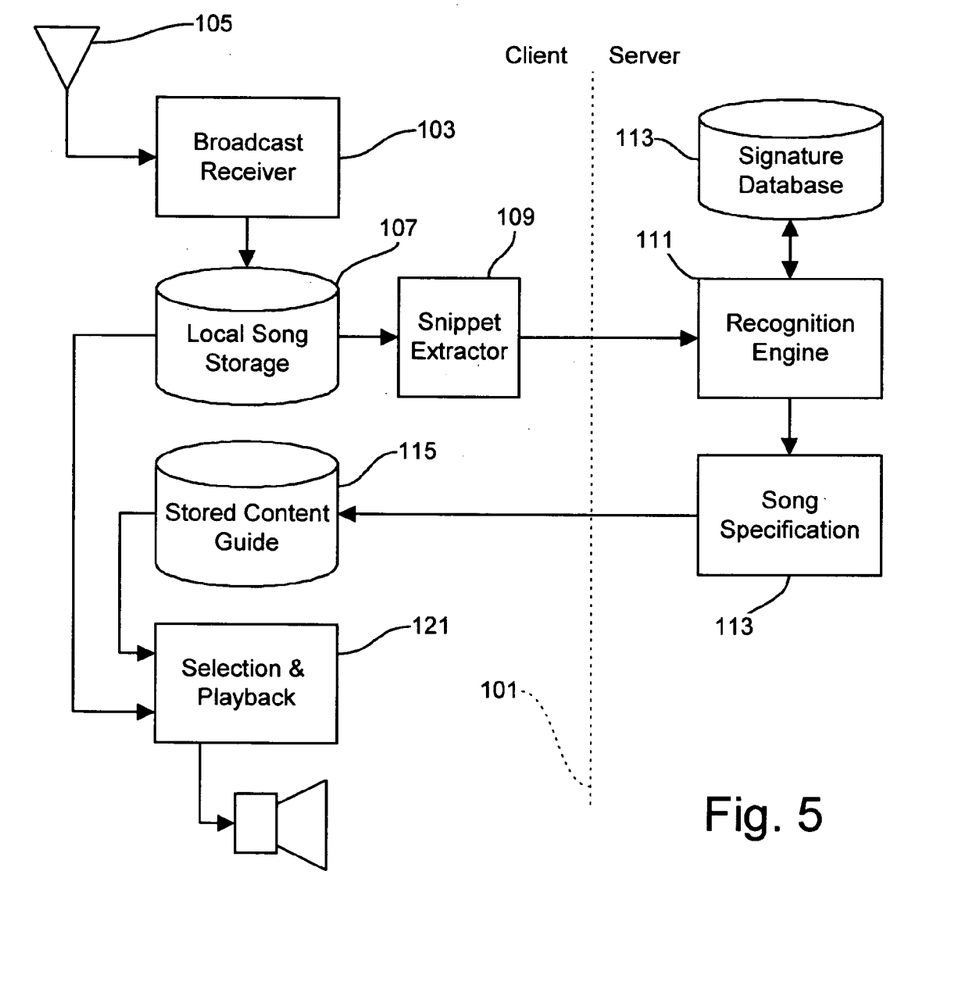
FIG. 5 is a block diagram of a client-side program storage and playback device interconnected via a communications pathway to a remote server which recognizes snippets of programs received from the client-side unit and which returns descriptions of matching program segments, such as individual songs, to the play back unit.

The basic mechanism employed, as shown in FIG. 5 of the drawings, functions in generally the same manner as the arrangement discussed above with reference to FIG. 4, and consists of a client-side recorder/player, shown at the left of the vertical dashed line 101, and a song identification server shown at the right of the line 101.

The recorder/player consists of a broadcast receiver 103 coupled to an antenna 105 for receiving, demodulating and digitizing broadcast signals and for recording those signals on a substantially continuous manner in a local storage unit 107. On the client-side, a "snippet extractor" 109 sends brief digitized segments, here called "snippets," to the recognition engine 111 at the server.

The recognition engine 111 compares each snippet with a database 113 containing prerecorded programming, such as popular songs. When an incoming snippet from the client recorder/player matches one of the items in the database 113, information describing the matching item is returned to the client side and stored as a record in the stored content guide seem at 115. The transmitted information includes data specifying the time duration between the beginning of the identified snippet and the beginning of the program item (e.g. song) from which the snippet was taken, the time duration between the beginning of the snippet and the end of the program item, as well as descriptive information about the program item (e.g., song title, performer, composer, album name, date performed, etc.). Using the information thus accumulated, the user of the player recorder can review listings of songs that are available in the local song storage unit 107, and play back any song or other program item listed as indicated at 121.

The broadcast receiver 103 may be set by the user to continuously record the broadcast from a preselected a radio station, or may be programmed to switch to different frequencies at different times to record different selected programs from different stations. The incoming signal may be derived from an AM or FM radio broadcast, or from the audio portion of television programming. The principles of the invention are applicable to television programming as well, and may be used to store, catalog and play back television programs and segments of television programs.

A variety of different program extraction and recognition mechanisms may be used to implement the invention. See, for example, U.S. Pat. No. 5,577,249 entitled "Method for finding a reference token sequence in an original token string within a database of token strings using appended non-contiguous substrings"; U.S. Pat. No. 4,918,730 entitled "Process and circuit arrangement for the automatic recognition of signal sequences," U.S. Pat. No. 4,739,398 entitled "Method, apparatus and system for recognizing broadcast segments," and U.S. Pat. No. 4,697,209 entitled "Methods and apparatus for automatically identifying programs viewed or recorded."

The signature database 113 and recognition engine 111 preferably takes the form of a shared system to which multiple client-side recorder players may be connected via a suitable digital communications pathway such as the Internet or a direct modem connection via the dialup telephone system. The broadcast receiver 103 preferably includes analog-to-digital converter and a digital compression mechanism to conserve space on the local storage unit 107 and to reduce the size of each snippet sent to the server.

The selection and playback mechanism 121 preferably includes means for displaying a listing of the available programs and program segments stored in local storage unit 107, means for searching the information in the stored content guide 115, and means for selectively playing and erasing selected items in local storage 107 that are identified in the stored content guide information at 115. All of these functions may be performed, if desired, by a suitably programmed personal computer equipped with a TV-Radio tuner card, such as the Hauppauge WinCast/TV-Radio card, and utilizing the PC's local hard disk to provide both the local song storage and storage for the stored program and content guide. An Internet connection from the client PC to a remote server may be used to upload snippets and download program and program segment specification data either continuously or on a batch basis. In the batch mode, the snippet extractor 109 may scan pre-recorded program segments in the store 107 and pass them to the recognition engine 111 for processing at "off hours" when the added computational and communications burden placed on both the client and server side apparatus may be more efficiently handled.

If desired, snippets which are transmitted to the server but not recognized, and which hence represent programming which cannot be automatically cataloged, may be automatically deleted from the storage unit 107 after a predetermined time, whereas recognized program segments may be retained until there disposition is specified by the user.

As the listener accumulates a large number of previously recorded programs or program segments (e.g. songs) which he or she desires to retain, it would be desirable to move those recordings to a central server to free space on the local storage unit, and to allow the user to access the stored material from other players. To this end, the arrangement shown in FIG. 6 of the drawings further includes a mechanism, seen at 123, for identifying and transmitting programs and programs segments to be added to the library file 125 maintained at the remote server. As indicated at 127 in FIG. 6, the program material in the remote library file 128 may be retrieved for playback and returned local storage when desired. Those elements seen in FIG. 6 which provide the same functions as like units shown in FIG. 5 are identified by the same reference numbers.

Figure 6:
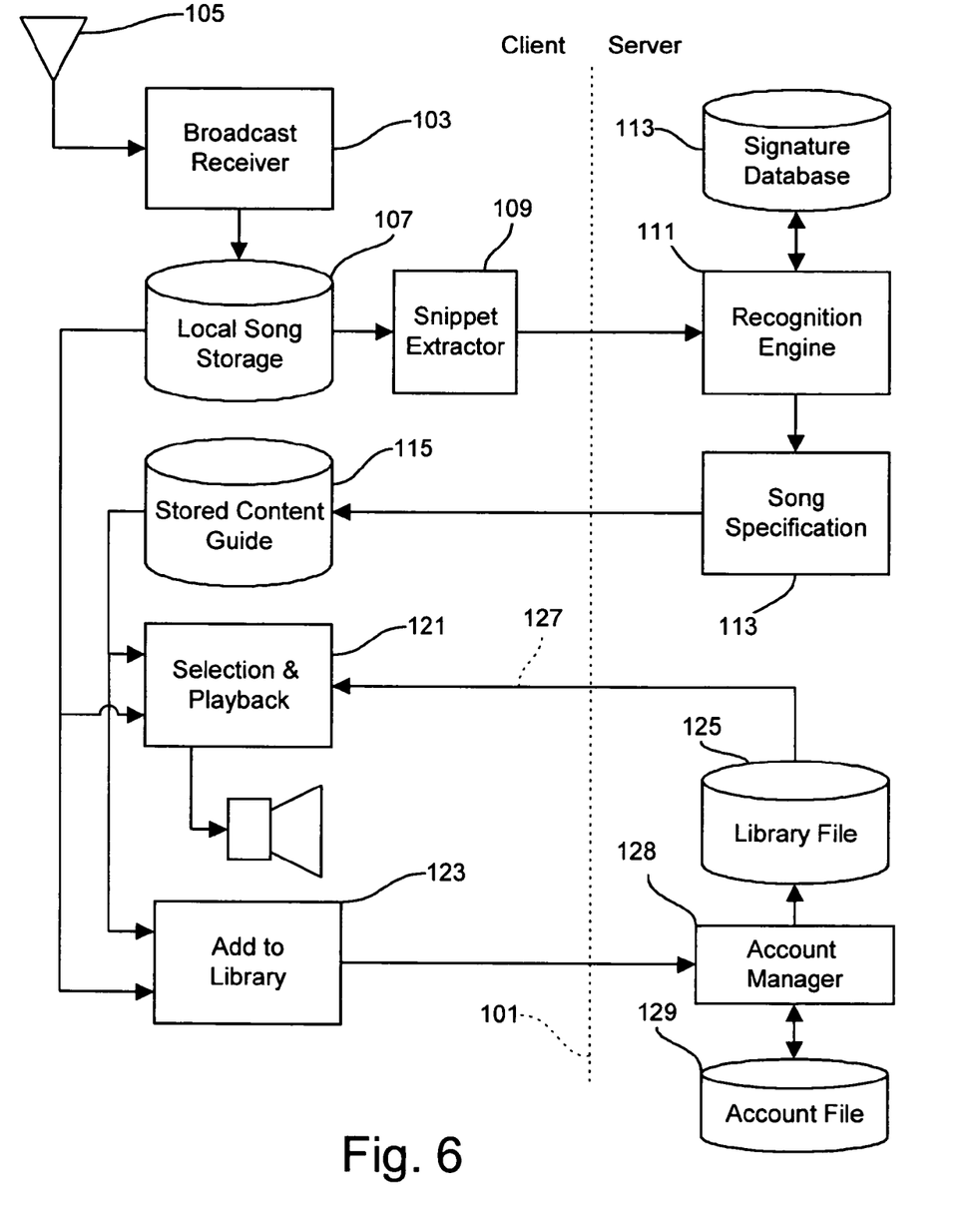
FIG. 6 is a block diagram of program storage and playback system including a mechanism for storing program content on behalf of the user on a central remote shared server.

Multiple users may share the library file 125, with only a single copy of each program segment actually being stored. When a client station signals its intent to store a given program or program segment which has been stored in its local storage unit 115, and that program or program segment is already stored in the shared library file 125 as determined by a server-side account manager routine indicated at 128, rather than actually transferring a copy from the client to the server, the copy at the client side is simply erased and an accounting entry is stored in the account file 129 to indicate that a "virtual transfer" of the file has been made. In this way, the copyright on the broadcast program material is protected against making any copy beyond the single copy for listener's personal use. User's who have not actually first created their own copy in local storage on the client recorder/ playback unit cannot obtain an accounting "credit" which will entitle them to download the library file copy.

To insure that only one copy can be used, the system could "lock" the original copy at the time the transfer or virtual transfer was made, making the original copy inoperable even though it is still resident (not yet erased) on the client player. The lock could be opened later after a secure message was received from the server indicating that the accounting credit was being eliminated in the account file 129. In this way, the owner of a recorded program segment can play that segment on different players at different times, while the system insures that only one operative at any one time.

Each song in the library file 128 would thus be available only to authenticated individuals who had earlier uploaded the song to the server. The master copy on the server would remain operable to be downloaded to other individuals A server that would download (or unlock if it was already there) a copy to a user's second PC after verifying that the copy on the first PC was locked thus ensuring one copy per user.

Note also that a user may purchase the right to play and locally record a program segment downloaded from the server. The system that would register record/CD purchasers and allow them to download temporary copies of their purchased material to a remote site following appropriate identification.

Furthermore, users might be able to exchange or sell their personal copies of songs. To this end, the server could manage the sale or auction of previously purchased "virtual copies".

In order to reduce the cost of the service provided by the server, and to compensate the copyright owners of the program material, advertisements could be added between programs or program segments (songs).

In addition to, or as an alternative to, the automatic snippet recognition mechanism discussed above, There are several less elegant, but nonetheless practical methods to identify and mark the boundaries of desired program segments stored in the local storage unit 107. The recorder/playback unit could include means for manually marking the beginning and ending of a desired program segment which the user desires to save in his or her "virtual jukebox. Intelligent fast forward and backward buttons, speech speedup software (with pitch control so one could listen to the music in fast-time) to get to the end quickly, set-time jumps back and forth, etc. could be used to facilitate the markup process. These techniques might work particularly well in the car given that the listener has the time to do the required "work".

A music/talk recognition mechanism may be used to delimit the song. This approach rely on an algorithm or circuit that distinguish music from the spoken word (in something akin to "audio scene-change" in video technology). For example, the arrangement described in U.S. Pat. No. 4,542,525 entitled "Method and apparatus for classifying audio signals" processes an audio signal and derives either a speech recognition signal, a music recognition signal or an indication of an unidentifiable signal.

Another implementation employs algorithms to separate two songs. That is, the system would be able to distinguish the beginning of one song and the end of another—songA/songB recognition. These transition points would then be used to help delimit songs within a stored audio stream. This technique would work in conjunction with a music/talk recognition system that separates the talk from the music would be more important than separating the occasional pair of songs that have no talk between them.

These delimitation techniques would then be applied to the audio stored in a time-shifted radio system. The talk or ads between songs could be eliminated either automatically or through user actions. With the bookmarks separating songs, the listener would be able to use an input device (such as a push button or voice-recognized spoken commands) to quickly surf from song to song. The user could then key in, or dictate using voice recognition, descriptive information about any desired song to be saved for future playback, the descriptive information being placed in the stored content guide 115.

Another form of automatic bookmarking would involve "talk radio." In this environment the system would offer another form of recognition—speaker identification. For talk radio this would allow listeners to jump from segment to segment as new speakers joined in the conversation. Each time a new voice was identified, a bookmark would be planted.

Specific word or phrase recognition would also be used to identify segments. For instance, the traffic report each day might start with the same phrase which could be recognized with standard speech recognition technology. The system would place intelligent bookmarks (intelligent in that they related to a known topic) at these identified locations.

Entire talk shows or news broadcasts could be translated to text via speech recognition. Listeners could use the voice input devices in their Car PCs to request topics to hear about. These topics would be selected based on word matches.

Finally, bookmarks could be created that merely related to time. Thus, a listener might surf through a time-shifted block of audio and one of the bookmarks might be the audio corresponding the top of the hour or the breaks at every quarter hour.

In another implementation of a delimiting system, computer readable information, possibly in the form of RDS information identifying the song, performers, etc., might accompany the broadcast of a song. In the case of an Internet broadcast, this might include computer readable data such as the name of the song, performer, etc. If these tags were at a known and consistent location vis a vis the start of the song, this would allow for accurate delimiting of the song. If it was inconsistently placed, but generally located near the beginning of a song, then a song could be excised out but it would have some extraneous material associated with it. A system could be devised that excised out a 5 minute block from a buffer surrounding such an identifier. The user could then manually edit the extraneous material.

Another implementation of time-shifted radio listening would involve a multi-tuner broadcast receiver 103. This system would continuously try to delimit songs on multiple channels at once using our original song recognition algorithms (on the client or server machines), or the ideas of music/talk recognition or songA/songB recognition. Multiple tuners could even be useful in the case of manual markups as this can probably be done faster than real time. One implementation of this would use high end equipment that could digitize all the channels in specific spectrum range with a single circuit.

In the operation of a time-shifted radio system, with limited tuners and limited disk storage, the user in general has three playing options:

1. To play a song out of a stored jukebox (presumably stored long ago)
2. To play a recently stored song (involving a short time-shift)
3. To play a song that was being broadcast live at the moment of play.

The Channel Changer implementation is optimized for the latter two options—options which would be most likely in systems with limited memory, or ones with larger memory but little content yet stored. In these cases the listener is more dependent on what is being broadcast at the present than on what is stored on disk from earlier recordings. As a result, a system that finds the greatest number of good songs quickly will have additional utility.

There are several aspects of the Channel Changer system which attempt to emulate the methods that people use as they search for good songs by switching from channel to channel in a car.

In this implementation, song recognition technology (of any of the types described above) is combined with multiple radio tuners, each with its own buffer, and channel-changing algorithms that would be used to intelligently tune the radio tuners to the optimal set of stations. (One of the tuners would be the "playing tuner", while the others would be "searching tuners".) This system will allow a listener to quickly surf multiple radio channels and "pull down" and store the greatest number of desired songs in the shortest time (compared to a single tuner system or a multi-tuner system without channel-changing algorithms).

The system would consist of a database of song fingerprints and the requisite recognition software. The song fingerprints would be as close to the front of the song as possible (not too close or the DJ might chop it off) so that song identification could happen as soon as possible once the song started playing.

Each searching tuner would have a buffer available to it (which could be as short as the distance from the beginning of a song to the fingerprint plus processing time) to capture the audio before reaching a given song's fingerprint. Once the fingerprint was found and identified, the song would be rated on a "desirability" scale. The audio before the buffer before the fingerprint would be combined with the rest of the song. The next step would be dependent on which playing option was in effect:

1. Under this option, the song would be saved in the jukebox. If there is not enough unused memory to save the song, the system would compare the new song's rating to that of the song in the jukebox that had the lowest rating. If the new song has a higher rating, it would replace the existing song having the lowest rating. The process would continue over time over multiple tuners, gradually lifting the average rating of songs in memory.

2. Under this option, the song would be saved in a short term buffer and queued up for playback. Again, if the queue was filed, the new song would have to be better than the worst song in the queue to find a space.

3. Under this option (which uses minimum memory), the playing tuner would switch over to the new song as soon as it was being broadcast. There would not necessarily be storage of the whole song. The switch to the new song would be made with some consideration being given to how much better the new song is, and how close the old song is to being over.

This search algorithm to find better stations to tune to using multiple tuners would have several steps. The first would be to rank stations by the probability of finding a desired song. This list could be fluid and change depending on the number of successful searches completed on each station over a recent period of time.

Then, using a predictive algorithm which would keep track of which channels had just played a song and which were in the middle of a song or an ad, the system would predict the probability of finding a desired song in the immediate future on any one given station.

The station ranking and the "song-immediacy probability" would both be assessed to decide which station to send the next available tuner to. There the tuner would wait for the next song to come on and be identified. If would then assess the desirability of the new song and under playing options 1. see if the song warranted space in the jukebox,
2. buffer the song and put it in the playing queue
3. switch the playing tuner over to the newly found song.

(Under scenario 3, the user might want the flexibility to use fingerprints that are deeper into the song. Deeper fingerprints would allow the search tuner to identify a song even if it was "found" while in the middle of its playback. This would allow especially desirable songs to be listened to in part. Ideally however, the system would have a separate tuner for each worthwhile station. This would eliminate having to jump from station to station and deal with partial songs.)

The recorder/playback unit can be programmed to develop song desirability ratings automatically. The rating system could learn from the listener:

1. It could watch to see if, and when, a listener skipped out of a song as it was being played under any of the three listening options.

2. It could monitor if, under option #3, the user un-did a swap presented by the system.

3. The system could also keep track of over how long a time, and how many times, each title had been listened to and deduce a decay rate in the desirability in that song due to the multiple exposures. The system could learn what the listeners typical desired decay rate was.

4. Also, the user could have a simple rating interface whereby he or she could consciously rate songs so the system would know how to rate them later. The rating system could be an ongoing process so that a user could help the system understand over time at what rate the listener might be growing tired of a new system. This could be a simple "thumbs down" button that might depress the songs rating in the personal jukebox so that the song would not be played as often.

In addition, a self-reflective mechanism could be employed. That is, if the user expressed a preference for the Beatles tune #1, the system then knows which songs are most like that and puts the others in the desirability scale accordingly.

For a car-PC system, the buttons on the standard radio could be used for any of the skipping and approval rating functions mentioned above.

An interesting and potentially valuable use for this information would be to provide the song ratings back to the broadcasters or record companies. This information could be uploaded when the system "docks" to receive more song fingerprints if that system is employed, or a separate communications step may be used to transmit this information.

With the vast amount of music in existence and being played over the airwaves, a major problem is figuring out what an individual listener may like—and then using this information to listen to the songs have a higher probability of being desirable. Solving this problem is a three step process. First the listener must get exposed to wide range of new material. Radio broadcast (over the airwaves or Internet) is perfect for this. It pushes at listeners randomized playlists of songs grouped around certain musical interest groups.

The second step is "documenting" the listener's tastes while listening. And the third step is making the song available for replay. This can be done by merely waiting to hear it again on the radio, buying the record, or using the present invention to "snip it" out for future listening. With the system contemplated by the present invention, the listener can document his or her preferences and save the song all at the same time.

The car is the ideal environment to use this aspect of the invention as the listener is easily able to hit a button or use a verbal command to rate or store a desirable song when it is being played.

Once a personal jukebox has been developed, playlist software may be utilized. This enables automatic play of either randomized or listener-selected songs in much the same way a CD player does. When in user-controlled mode, the user would be able to work from an audio menu which would announce the group and/or song before playing. The listener could then surf through the jukebox while driving.

In random or playlist mode, the system would adapt and use some of the playlist software used by radio stations to construct the random playlists. This software would continuously scan new songs that had been delimited by the system and offer them as new material to the listener. An audible signal would announce that this was a new song. The user could command the system to discard the song and not play it again or rate the song during the first or a subsequent play which would then allow it a place in the jukebox. The playlist generator would attempt to optimize the presentation of new material to a listener based on past listening habits, surfing actions, and explicit expressions of interest in certain types of music.

Another use for song identification with a stored audio system would be to purchase the song being played much in the same way that the listener can now while listening to an Internet broadcast. Other interactive features would be to allow the listener to request information about the band, etc.

Another use for song recognition technology (whether on the client or server side) would be to help listeners identify a specific song that they can't remember—a computerized version of "name that tune". For instance, a user might be able to sing, or perform with an instrument, a few notes of a song. The system would come back with a match or a list of songs that may match the user's attempt to sing the song. The user could then play some of the songs on the "possible matches" list or may recognize the song by the name. In any case, the user might go on from there to buy the song that matched his or her "performed" rendition or cite it as a song for which it would desirable to capture with the song recognition system when played over the radio again.

It is to be understood that the specific arrangements which have been described are merely illustrative applications of the principles of the invention. Numerous modifications may be made by those skilled in the art without departing from the true spirit of the invention.

What is claimed is:

1. A method for selectively reproducing locally stored programming signals comprising, in combination, the steps of:
    storing a first set of separate programming segments at a client location,
    at said client location, employing processing means to derive identification data from each of said first set of separate programming segments,
    transmitting said identification data from said client location to a remote processing location,
    at said remote processing location, comparing said identification data with a database containing identification information and associated content descriptions for each of a second set of programming segments to identify common program segments found in both said first and said second set of programming segments,
    transmitting from said remote processing location to said client location selected ones of content descriptions stored in said database which describe said common program segments, and
    at said client location, presenting said selected content descriptions to a user to facilitate the selective processing of said common program segments.

2. The method set forth in claim 1 wherein at least some of said programming signals are recorded musical performances.

3. The method set forth in claim 2 wherein at least some of said content descriptions specify one or more attributes of the corresponding recorded musical performance from the group of attributes consisting of the title, performer, composer, and date of the corresponding recorded musical performance.

4. The method set forth in claim 1 wherein said step of storing said first set of separate programming segments comprises receiving and recording broadcasted programming signals.

5. The method set forth in claim 4 wherein said identification data contained in said database are derived from said broadcasted programming signals received at said remote processing location concurrently with the reception and recording of said broadcast programming signals at said client location, and said content descriptions transmitted to said client location from said remote processing location are used at said client location to facilitate the selective time-shifted reproduction of said broadcast programming signals.

6. The method as set forth in 1 wherein said content descriptions transmitted from said remote processing location to said client location include information specifying the beginning and ending time of each of said common program segments.

7. The method as set forth in claim 1 further including the steps of transmitting one or more selected ones of said common program segments from said client location to said remote processing location, and storing said selected common program segments at said remote processing location for subsequent retrieval.

8. The method as set forth in claim 1 further including the steps performed at said remote processing location comprising:
    maintaining a stored library containing said second set of programming segments at said remote processing location,
    accepting a retrieval request from said client location specifying one or more particular ones of said common program segments, and
    responding to said request by transmitting to said client location the content of said one or more particular ones of said common program segments.

9. The method set forth in claim 8 further comprising the steps of uploading a copy of a program segment stored locally at said client location to said remote processing location and storing the uploaded copy in said stored library for later retrieval from said remote processing location.

10. The method set forth in claim 8 further including the steps of posting an entry in an accounting file upon the transmittal of said identification data to said remote processing location, subsequently transmitting a playback request identifying said client location and identifying a requested program segment, and authorizing the transmittal of said requested program segment if said accounting file contains data indicating that identification data for said requested program segment was previously transmitted from said client location.

11. The method set forth in claim 10 further including the step of disabling the playback of a local copy of a program segment when the remote playback of said program segment is authorized at said remote processing location.

12. The method set forth in claim 10 further including the step of disabling the transmittal of said requested program segment from said remote processing location when the playback of the copy of said requested program segment locally stored at said client location is enabled.

13. A method for selectively reproducing previously broadcast programming segments comprising, in combination, the steps of:

employing a first broadcast receiver at a client location for capturing a broadcast signal, recording said broadcast signal in a local storage unit in a substantially continuous manner as said signal is received at said client location;

processing said broadcast signal at said client location to extract brief segments from the content of said broadcast signal, utilizing a communications channel to transmit said brief segments from said client location to a remote processing location;

comparing said segments received from said client location with a library of previously recorded programs to identify particular programs which contain segments matching the segments received from said client location, and transmitting program guide data describing said particular programs to said client location from said remote programming location.

14. The method as set forth in claim 13 further including the steps of displaying said program guide data for use at said client station to facilitate the selection and reproduction of desired ones of said particular programs.

15. The method as set forth in claim 13 wherein said data identifying said particular programs includes timing information specifying the beginning and ending time of each of said particular programs.

16. The method as set forth in claim 15 wherein the steps of recording and processing said broadcast signal at said client location are performed by a programmed personal computer.

17. The method as set forth in claim 16 wherein said communications channel is the Internet.

18. The method as set forth in claim 13 further including steps, at said client location, of processing said program guide data to display a listing of the available programs in said local storage unit, and selectively processing said available programs in response to commands from a user.

19. The method set forth in claim 18 wherein said step of processing said available programs to selectively reproduce selected ones of said available programs.

20. The method set forth in claim 19 wherein said step of processing said available programs further includes selectively erasing designated ones of said available programs.

* * * * *